United States Patent
Wagner et al.

[11] Patent Number: 5,157,458
[45] Date of Patent: Oct. 20, 1992

[54] POLARIZATION INTERFEROMETER SPECTROMETER

[75] Inventors: Heinz Wagner, Zürich; Martin Labhart; Ulrich Glaus, both of Rüti, all of Switzerland

[73] Assignees: Bühler AG, Uzwil, Switzerland; Bran & Luebbe GmbH, Norderstedt, Fed. Rep. of Germany

[21] Appl. No.: 598,697

[22] PCT Filed: Jan. 15, 1990

[86] PCT No.: PCT/CH90/00008
§ 371 Date: Nov. 2, 1990
§ 102(e) Date: Nov. 2, 1990

[87] PCT Pub. No.: WO90/10191
PCT Pub. Date: Sep. 7, 1990

[30] Foreign Application Priority Data
Mar. 3, 1989 [CH] Switzerland .................. 803/89

[51] Int. Cl.$^5$ .................................. G01B 9/02
[52] U.S. Cl. ........................ 356/351; 356/346
[58] Field of Search ............. 356/346, 351, 353, 354

[56] References Cited
U.S. PATENT DOCUMENTS

| | | | |
|---|---|---|---|
| 3,737,235 | 6/1973 | Hawes | 356/351 |
| 4,320,973 | 3/1982 | Fortunato et al. | 356/351 |
| 4,732,482 | 3/1988 | Rippel | 356/346 |
| 5,013,153 | 5/1991 | Disch et al. | 356/351 |

Primary Examiner—Samuel A. Turner
Attorney, Agent, or Firm—Martin A. Farber

[57] ABSTRACT

The polarization interferometer comprises a source of light (1), a collimator (2), a first polarizing means (3), a double-refractive means (4,5,6) and a second polarizing means (7) which polarizes the light emerging from the double-refractive means (4,5,6) and directs it to a photon detector (8). The double-refractive means (4,5,6) consists of two optical wedges (5,6) displaceable along those lateral surfaces which face each other, said wedges complementing each other to a right parallelepiped, and of a double-refractive, plane-parallel plate (4) serving as a compensator. The optical axis of the compensator (4) is twisted in a plane perpendicular to the light beam by a finite angle relative to that of the two wedges (5,6), the optical axes of the two wedges (5,6) coinciding with each other. The optical axes of the two polarizing means (3,7) are arranged perpendicularly or parallely to each other and are aligned non-parallely to the axes of the two wedges (5,6) of the double-refractive means (4,5,6).

44 Claims, 5 Drawing Sheets

POLARIZATION INTERFEROMETER SPECTROMETER

FIELD OF THE INVENTION

The invention relates to a polarization interferometer which comprises a source of light, a collimator system for generating parallel light rays, a first polarizing means which polarizes the parallel light rays, a double-refractive element with at least two plane-parallel lateral surfaces being perpendicular to the polarized parallel light rays, and a second polarizing means which polarizes the light emerging from the double-refractive element and directs it to a photon detector.

BACKGROUND OF THE INVENTION

The most important and most frequently used interferometer is the Michelson one with its many modifications. The light of a mostly monochromatic light source is split up by a semitransparent, reflecting surface of an optical beamsplitter into two partial beams. After its reflection by two mirrors, the beamsplitter recombines both of them to a single light beam. This union leads to interference fringes whose contortion or displacement constitutes a measure for the difference of the optical paths between the two partial beams.

The known interferometers can be used for a great number of tasks, e.g. for:
measuring the spectral composition of the light;
measuring the velocity of light;
measuring the imperfections of optical plates, lenses and whole objectives;
direct measuring of lengths and path length differences;
measuring of optical inhomogeneities and streams.

The known interferometers, however, provide the following disadvantages:
For measuring the spectral composition of light, they can usually be employed only for that light extending until the medium infrared range; for light in a more short-wave range there are considerable expenses for equipment;
the planarity of the employed optical construction units must be excellent; and
in a double-beam interferometer a precise guidance of the mirror, when moved, becomes indispensable.

The invention alleviates the foregoing problem. The invention has the basic task to provide a polarization interferometer differing from the conventional apparatuses in so far as:
it broadens the spectral region of the polarization interferometer by a factor of one hundred as compared with the known Michelson arrangement, without increasing the expenses; and
the single beam interferometer underlying the invention allows a robust design which is relatively insensitive to vibrations.

SUMMARY OF THE INVENTION

The invention attains the desired aim by using a polarization interferometer of the kind described which is characterized in that the double-refractive element consists of two optical wedges displaceable along those lateral surfaces which face each other, said wedges complementing each other to a right parallelepiped, and of a double-refractive, plane-parallel plate serving as a compensator. The optical axis of the compensator is twisted in a plane perpendicular to the light beam by a finite angle relatively to that of the two wedges and the optical axes of the two wedges coincide with each other, while the optical axes of the two polarizers form an angle with one another the value of which is divisible by 90 degrees, i.e. they are perpendicular or parallel to each other.

The advantages obtained by the invention are essentially defined by the fact that, thanks to the polarization interferometer provided by the invention, the range of the measurable spectral region can be extended by at least a hundred times in relation to all known kinds of measurements applied in the field of Michelson interferometry measuring the displacement of the movable mirror as compared with the stationary mirror. Further, the optical construction units used in the interferometer provided by the invention have to meet far less severe requirements in regard of precision and planarity.

Contrary to the double-beam interferometer, the two parts of one and the same beam of light polarized perpendicularly to one another are brought to interference in the case of the interferometer according to the invention. This provides the advantage that even in case of image defects (e.g. by mechanical vibrations or imperfect driving mechanisms and guidances) the spatially lateral interference is entirely preserved since both polarizing components are conjugated at the same place. This particularly allows a far higher speed in carrying out the interferogram.

Due to its mechanical insensitivity to ambient conditions and the low testing time, the polarization interferometer in accordance with the invention particularly applies—besides its previously mentioned uses—to routine analysis in laboratories and industrial enterprises; taking up the spectrum in the near infrared wave range makes it possible, by way of example, to determine the existence of nitrobenzene and of any possible impurities in a fast and reliable manner.

A further preferred application of the polarization interferometer according to the invention is the one as a spectrometer within the near infrared range and within the visible wave range.

BRIEF DESCRIPTION OF THE DRAWINGS

Various embodiments of the invention, which, at the same time, explain its functional principle, are represented in the drawings and will hereafter be described in further detail.

DETAILED DESCRIPTION OF THE PREFERRED EMBODIMENT

Figure 1:
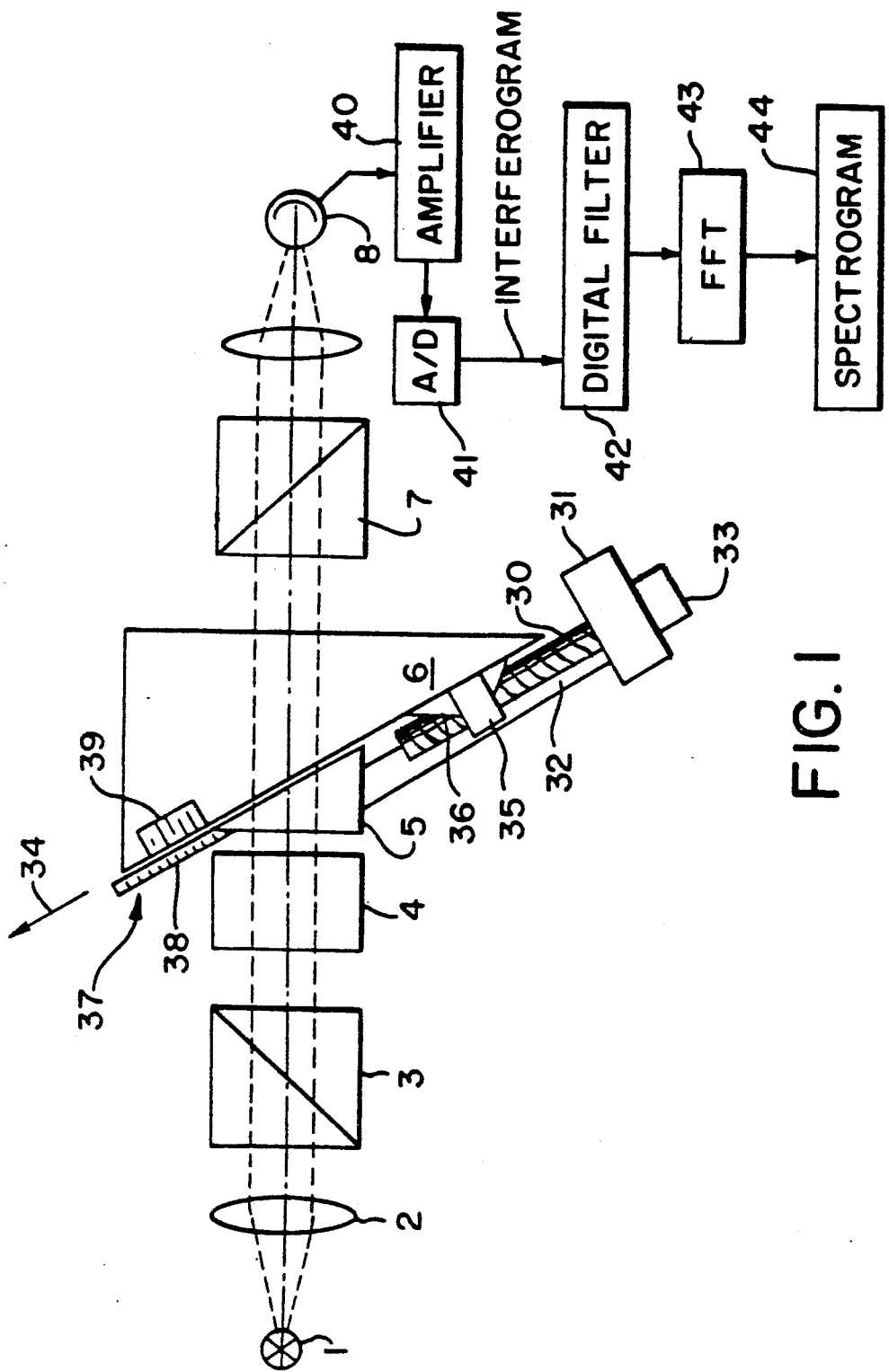
FIG. 1 represents a schematic arrangement of a polarization interferometer according to the invention with two polarizing elements.

The arrangement illustrated in FIG. 1 incorporates the simplest embodiment of the polarization interferometer. The beam of light emitted by a light source 1 is converted into a beam of parallel rays by means of a collimator 2. Said beam of light is linearly polarized by a first polarizer 3. Thereafter, it travels through a system comprising three double-refractive elements 4, 5 and 6. The optical axis of the first of these elements, designated as compensator 4, is twisted by an angle of 90 degrees relatively to the two other double-refractive elements 5, 6 within a plane perpendicular to said beam of light. The two other double-refractive elements are two optical wedges 5, 6, being displaceable relative to each other along opposed surfaces, and complementing one another to a right parallelepiped. The projections of the optical axes of these two wedges 5, 6 to the surface which is perpendicular to the beam of parallel rays coincide, and are oriented—according to the above-mentioned angle—with respect to collimator 2. The surfaces of the two optical wedges 5, 6 which face away from each other are perpendicular to the light beam, while the surfaces facing one another are parallel.

One of the two wedges 6 can be displaced in the direction of its hypotenuse (direction of the arrow), thus enabling a continuous adjustment of the total path of the optical beam within the three double-refractive elements 4, 5, and 6. A possible implementation for the displacement of wedge 6 comprises a threaded spindle 30 of a constant pitch which is driven by a stepping motor 31. The spindle 30 is fixed to the stationary part 32 of a sliding carriage 33 in the direction 34 of the hypotenuse of the wedge 6. A nut 35 is fastened to the movable part 36 of the carriage 33. The nut 35 rides along the threading of the spindle 30. In case the stepping motor 31 is driven with alternating current, of constant frequency and phase, the interferogram can be scanned synchronously to the current phase (rapid scan method). A diffraction grid assembly 37 having a grid element 38 on the wedge 5 and a grid element 39 on the wedge 6 measures displacement of the wedge 6 relative to the wedge 5 by means of a moire pattern. The optical beam subsequently traverses a further, second polarizer 7. If the optical path through the compensator 4 has exactly the same length as the total path of the optical beam through the two optical wedges 5, 6, the retardation or acceleration of the extraordinary beam of light relative to the ordinary one, which is effected by the double refraction, is exactly compensated for, with the consequence that no light reaches the photon detector 8 of the arrangement incorporated in FIG. 1, when using, as in the following assumed case, perpendicular polarizing axes of the two polarizers 3, 7.

If the displacement of the large optical wedge 6 is measured in relation to this point and if the large optical wedge 6 is displaced by the length x, an interference of the ordinary with the extraordinary beam of light results, due to the previously mentioned retardation of the one in comparison with the other beam of light in the double-refraction elements 4, 5, and 6.

The corresponding interference pattern S(x) is given by the following equation:

$$S(x) = \tfrac{1}{2} \int_0^\infty d\sigma I_L(\sigma)\, \eta_o(\sigma)\{1 - \cos(2\pi\Delta n\, \sin\alpha\sigma x)\} \quad [1]$$

in which $I_L(\sigma)$ represents the spectrum of the light source and $\sigma$ is the wave number, measured in cm$^{-1}$. $\eta_o(\sigma)$ describes the spectral sensitivity of the detector 8, $\Delta n = n_e - n_o$ is the double refraction, $n_e$ the extraordinary, $n_o$ the ordinary refraction index, and $\alpha$ the wedge angle according to FIG. 1.

The interferogram S(x) is now measured and digitized for discrete and equidistant wedge displacements $\Delta x$, brought about by a predetermined turn of the spindle. The spectrum, which is thereby obtained by discrete Fourier transform, can then be calculated down to the smallest wave lengt by $$\lambda_{ein} = 2\Delta n \Delta x \sin\alpha \quad [2]$$

according to scanning theorem, if the light source is of a sufficient intensity till there and the detector is sensitive there. If the movable mirror of a usual Michelson interferometer is displaced by the length $\Delta x$ in each case, the scanning theorem is defined by $$\lambda_{ein} = 2\Delta x \quad [3]$$

For a quartz wedge with $\alpha = 30°$ and $\Delta n \sim 10^{-2}$, the formula (2) leads to $$\lambda_{ein} = 10^{-2}\Delta x \quad [4]$$

That means that it is possible for a quartz wedge to measure a spectrum—at a constant stepping distance $\Delta x$—down to a wave range 200 times smaller than in the known Michelson arrangement.

Figure 2:
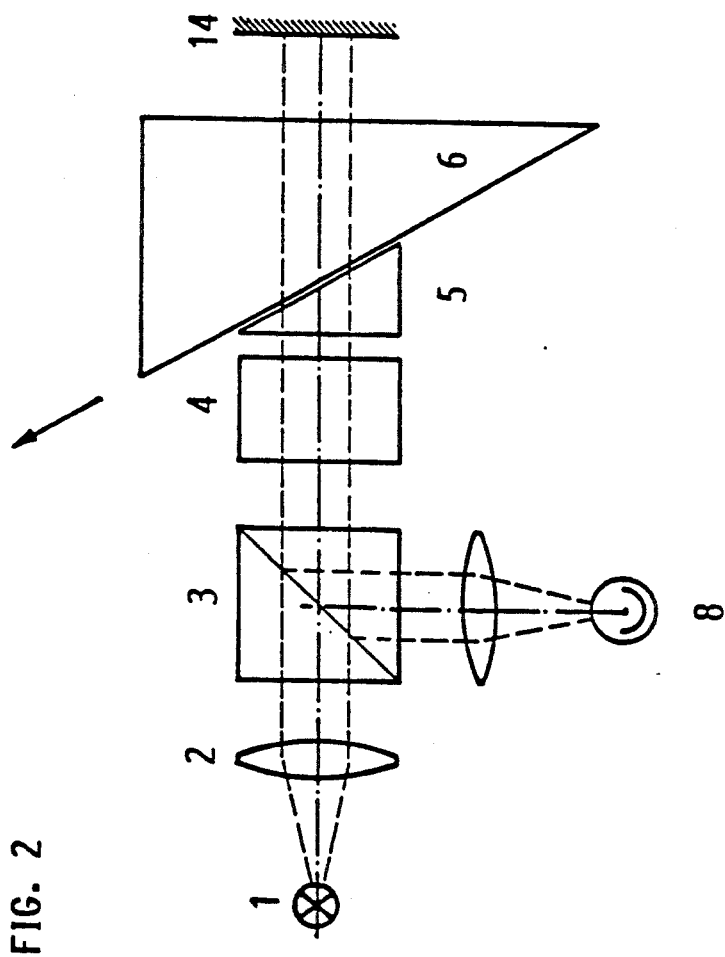
FIG. 2 depicts a schematic arrangement of a polarization interferometer provided by the invention with only one polarizing element.

In FIG. 2 the units designated with 1, 2 and 4, 5, 6 have the same meaning as in FIG. 1. After passing through the collimator, the light beam traverses a polarizing beamsplitting unit which polarizes it in a polarizing direction P. After that, it advances through the double-refractive elements 4, 5, and 6. Behind the movable wedge 6 there is provided a mirror 14 which reflects it back to itself as it is perpendicular to the beam direction. The optical beam now passes through the elements 4, 5, and 6, in opposite direction. It is then reflected toward the detector 8 by means of the beamsplitting unit 3 and is, at the same time, linearly polarized in a polarizing direction perpendicular to the previously-referred direction P. The intensity of light measured by the detector 8 is then given by the formula [1]in which the length of displacement x is to be replaced by 2x.

Figure 3:
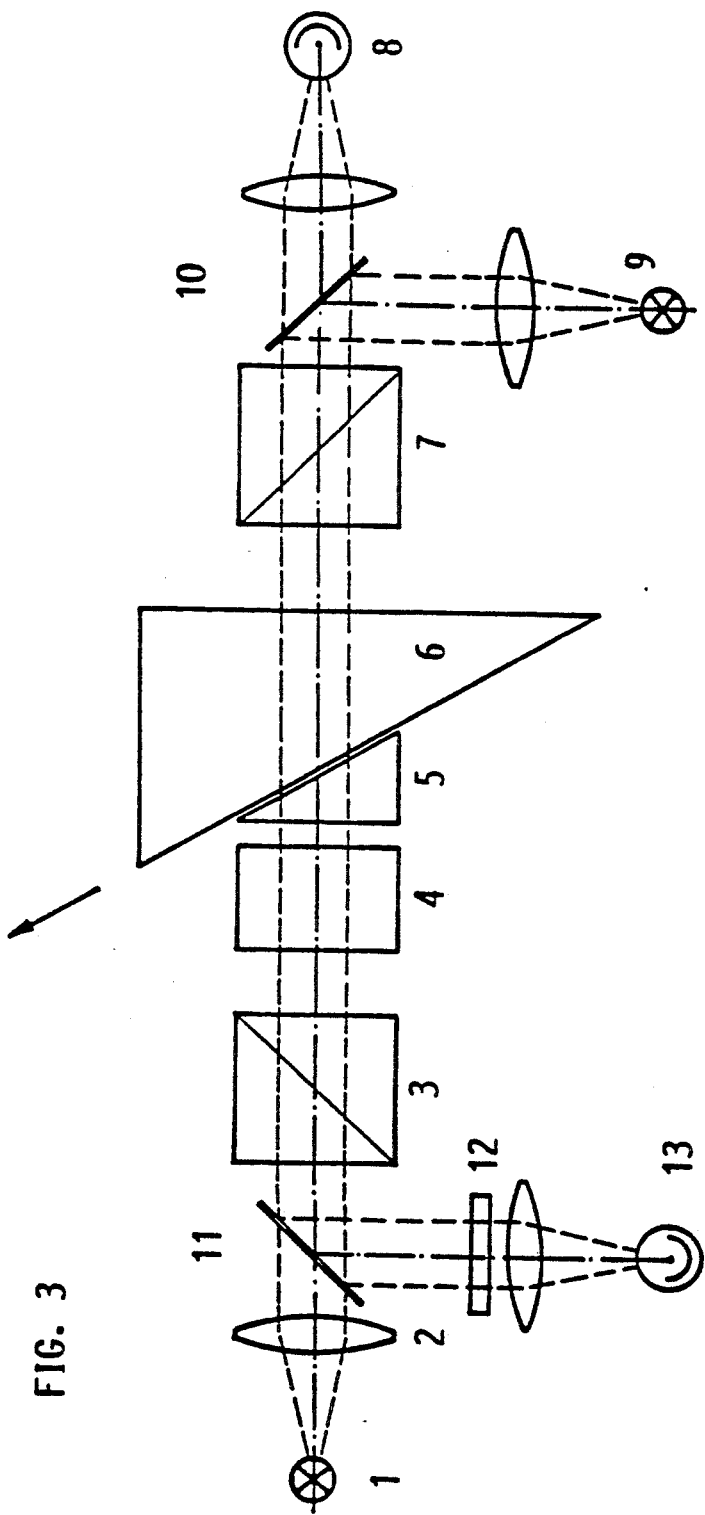
FIG. 3 illustrates a schematic arrangement of a polarization interferometer according to the invention, in which, by means of the interference of a monochromatic source of light, the displacement x can be measured directly by the arrangement.

In FIG. 3, the units designated with 1-8 have the same meaning as the ones in FIG. 1. The measuring of the length of displacement x, or the discrete stepping distance $\Delta x$ respectively, is effected by an additional arrangement in this embodiment. This one comprises, according to FIG. 3, a monochromatic light source 9 emitting a beam of light whose wave length $\lambda$ is to be smaller than the smallest wave length of the spectral region to be measured. The beam of light is reflected by a beam-splitting unit 10 so that it now traverses the arrangement in opposite direction, paralleling the measuring beam depicted as in FIG. 1, to finally reach a detector 13 after passing, via a further beam-splitting unit 11, through a filter transmitting solely the wave length of the beam, but not the wave lengths of the spectral region to be measured.

The function D(x) of the detector signal upon displacement x is calculated, according to [1], assuming a monochromatic light source of the wave number $$I_L(\sigma) = I_0 \delta(\sigma - \sigma_o) \quad [5]$$

by the formula $$D(x) = A \sin^2 Bx \quad [6]$$

with $$A = I_0 \eta_d(\sigma_o) \quad [7]$$

$$B = \pi \Delta n \sin \Delta a_o \quad [8]$$

The discrete and equidistant scanning of signal S(x) is carried out at each extreme value or at each point of a maximum slope of $\sin^2 Bx$, which corresponds to a stepping distance of $$\Delta x = 1/(2\Delta n \sin\alpha\sigma_o) \quad [9]$$

The arrangement according to FIG. 3 can also be modified in such a manner that the monochromatic beam is coupled into the measuring beam before the first polarizing element 3, by means of a first beam-splitting unit 11, and is then deviated through a second beam-splitting unit 10 and directed onto a photon detector.

Figure 4:
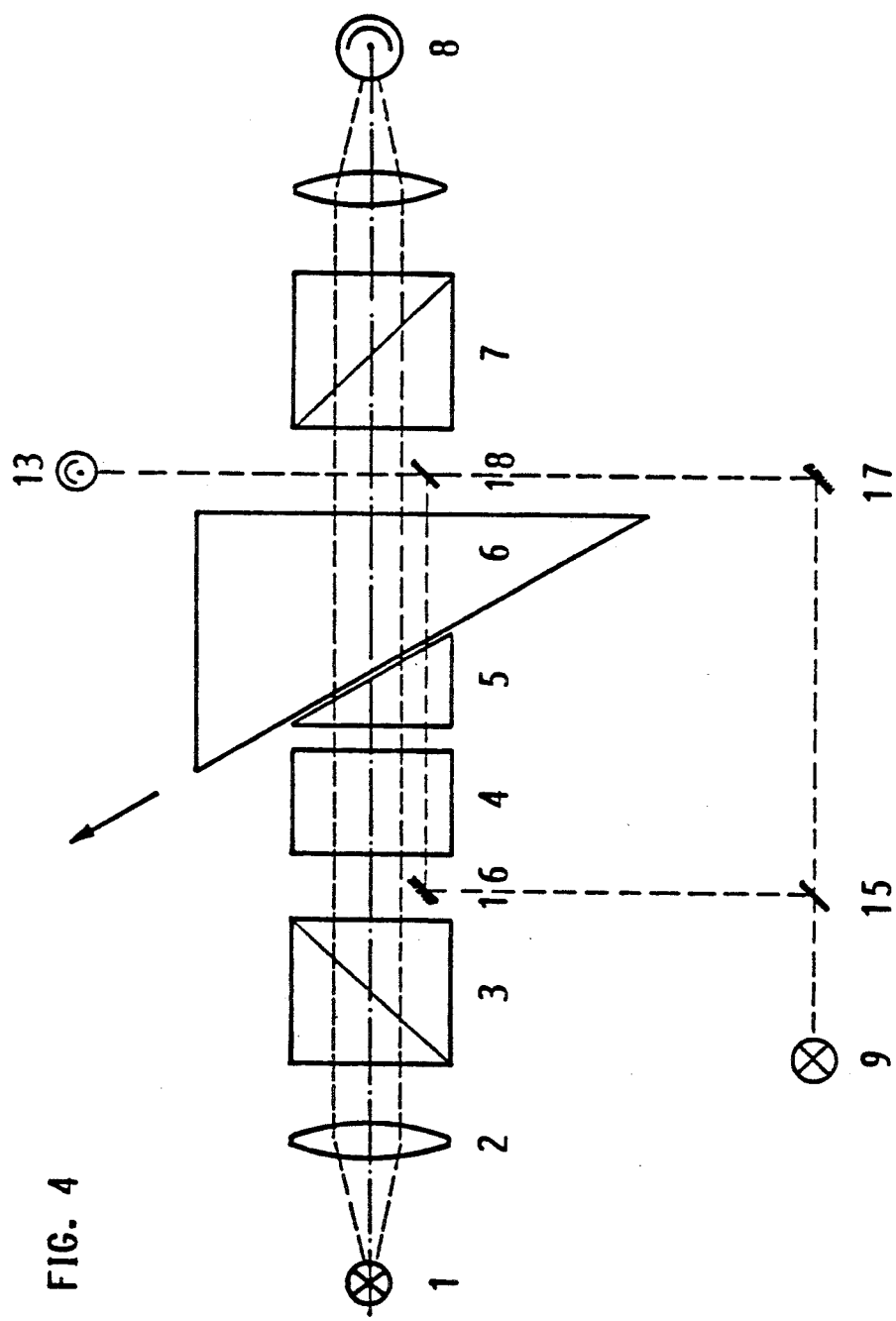
FIG. 4 represents a schematic arrangement of a polarization interferometer provided by the invention, in which displacement x is measured by means of the interference of monochromatic light beams, one of which traversing the arrangement and one traveling in the outside.

In the embodiment represented in FIG. 4 the measurement of lengths is again carried out by way of a monochromatic beam of light 9 of the wave length $\lambda_o$. This one is split up into two beams by a beam-splitting unit 15. One of these beams continues its way to a mirror 17 which reflects it toward a beam-splitting unit 18, and after passing through this, it finally reaches detector 13. The other one is reflected by a mirror 16, then traverses the double-refractive elements 4, 5, 6 and arrives at the detector via beam-splitting unit 18. For the corresponding detector signal the formulas [6]-[8] can be used, in which case the double refraction $\Delta n$ is to be replaced by $n_e - 1$ in formula [8]; $n_e$ is here the extraordinary refractive index, and it is assumed that the monochromatic beam 9 is linearly polarized, with the polarizing direction being perpendicular to the plane of the drawing and that this direction is the same as the direction of the optical axes of the two wedges 5, 6. The corresponding stepping distance is then $$\Delta x = 1/\{2(n_e-1)\sin\alpha\sigma_o\} \quad [10]$$

For quartz with $\Delta n \sim 10^{-2}$ and $n_e \sim 1.5$ results a stepping distance about 50 times smaller than in formula [9] and, therefore, according to formula [2], a measurable spectral region that is 50 times broader.

Figure 5:
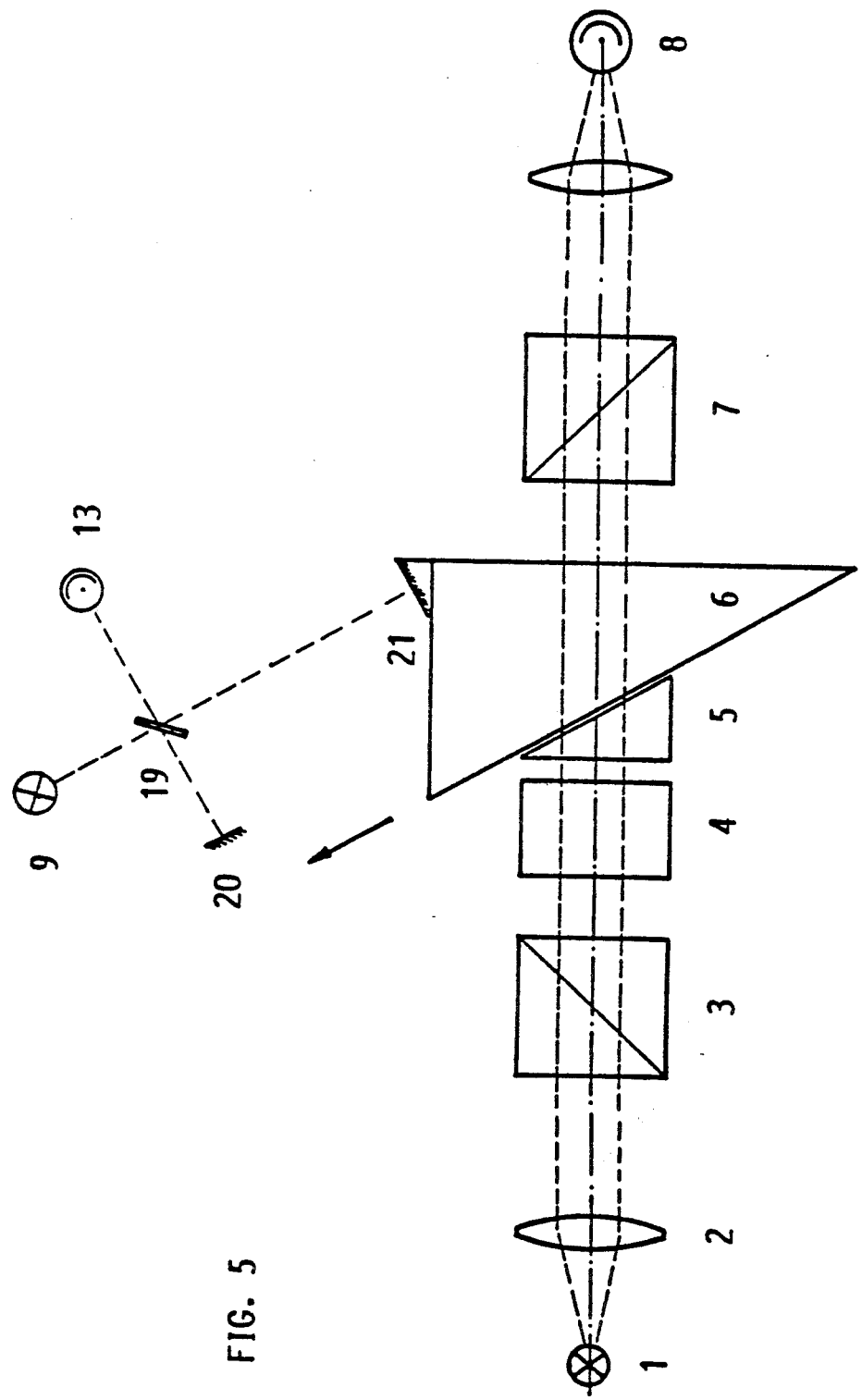
FIG. 5 represents a schematic arrangement of a polarization interferometer according to the invention, in which displacement x is measured, by means of a Michelson interferometer, with both light beams outside the arrangement.

In the embodiment represented in FIG. 5 the measurement of lengths is carried out with a monochromatic beam of light 9 of wave length $\lambda_o$ whose interference is produced by way of a Michelson interferometer 9, 13, 19, 20, and 21, the movable mirror 21 of which is firmly connected to movable wedge 6. For $\Delta x$ then follows $$\Delta x = 1/(2 \Delta \sigma_o) \quad [11]$$

which corresponds to a broadening of the spectral region by about a factor 4 as compared with formula [10].

The photon detector 8 used in all embodiments according to FIGS. 1 to 5 is, by way of example, composed of a lead sulfide cell or a silicon photodiode. The electrical current generated in photon detector 8, as shown in FIG. 1, can be amplified via amplifier 40 and converted by means of a analog/digital converter 41 into a numerical interferogram which can be subjected to further processing including digital filtering by filter 42. By means of FFT 43 (Fast Fourier Transformation) there finally results an interpretable spectrum in the form of a spectrogram indicated at 44.

We claim:

1. A polarization interferometer comprising:
   a source of light for emitting a beam of light;
   collimator means receiving said beam of light and converting said beam of light into a beam of parallel rays directed along an optical axis;
   first polarizing means for polarizing said beam of parallel rays;
   a double-refractive element including at least two plane-parallel lateral surfaces arranged perpendicularly to the polarized beam of parallel rays, said double refractive element including two optical wedge means each having a wedge surface and coinciding optical axes, said wedge surfaces facing each other to complement one another to a parallelepiped, said wedge means being displaceable relatively to each other along said wedge surfaces;
   a double refracting plane-parallel plate forming an optical compensator, the optical axis between said compensator and said wedge means being twisted within a plane perpendicular to said beam of light;
   second polarizing means for polarizing said polarized beam of parallel rays emitted by said double-refractive element along its optical axis;
   photon detector means receiving said polarized beam of parallel rays emitted by said second polarized means, the optical axes of said first and second polarizing means being arranged non-parallel to the optical axes of said wedge means, while forming an angle with each other having a value which is divisible evenly by 90°;
   electronic amplifying means connected to said photon detector means to provide an amplified output signal;
   analog/digital converting means connected to said amplifying means for converting said output signal into a discrete numerical interferogram;
   digital filter means for filtering said numerical interferogram;
   electronic means connected to said digital filter means for carrying out a Fourier Transformation of the filtered numerical interferogram; and
   spectrogram forming means connected to said electronic means for representing said filtered numerical interferogram after Fourier Transformation as a spectrogram.

2. A polarization interferometer as claimed in claim 1, wherein
   the optical axes of said first and said second polarizing means are perpendicular to each other.

3. A polarization interferometer as claimed in claim 1, wherein
   the optical axes of said first and said second polarizing means are parallel to each other.

4. A polarization interferometer as claimed in claim 1, wherein
   said first and said second polarizing means linearly polarize said beam of light.

5. A polarization interferometer as claimed in claim 1, wherein
the optical axes of each of said polarizing means form an angle of 45 degrees to the axes of said wedge means.

6. A polarization interferometer as claimed in claim 1, further comprising:
a monochromatic light source emitting a beam of monochromatic light; and
means for coupling said monochromatic beam of light with said beam of parallel rays, said coupling means including
first beam splitting means located behind said second polarizing means so that said beam of parallel rays and said beam of monochromatic light have opposite directions, and
second beam splitting means arranged before said first polarizing means, when seen in the direction of said beam of monochromatic light, for deviating the beam toward said photon detector means.

7. A polarization interferometer as claimed in claim 6, further comprising
optical band-pass filter means arranged before said photon detector means for allowing only said beam of monochromatic light to pass through.

8. A polarization interferometer as claimed in claim 1, further comprising:
a monochromatic light source emitting a beam of monochromatic light;
second photon detector means;
first beam splitting means for coupling said beam of monochromatic light into said beam of parallel rays, said first beam splitting means being located between said second polarizing means and said first-mentioned detector means; and
second beam splitting means located between said first polarizing means and said first-mentioned light source for deviating said beam of monochromatic light onto said second photon detector means.

9. A polarization interferometer as claimed in claim 8, further comprising
optical band-pass filter means arranged before said second photon detector means for allowing only said beam of monochromatic light to pass through.

10. A polarization interferometer as claimed in claim 1, further comprising:
a monochromatic light source emitting a beam of monochromatic light along an optical axis separated from the optical axis of said beam of parallel rays;
second photon detector means;
first beam splitting means for dividing said beam of monochromatic light into a first beam and a second beam;
first mirror means for coupling said first beam of monochromatic light into said beam of parallel rays, said mirror means being arranged between said first polarizing means and said compensator;
second beam splitting means arranged between said double-refractive element and said second polarizing means so as to provide a deviated optical axis directed toward said second photon detector means;
second mirror means arranged to deviate said second beam toward said second beam splitting means so that said first and said second beams meet again and are thereby directed towards said second photon detector means.

11. A polarization interferometer as claimed in claim 1, wherein one of said optical wedge means is movable relative to a second of said optical wedge means, said polarization interferometer further comprising
means forming a Michelson interferometer means, said Michelson interferometer means including a movable reflective surface arranged on said movable one of said wedge means.

12. A polarization interferometer as claimed in claim 1, wherein
the optical axes of said compensator, as compared to that of said wedge means, is twisted by 90 degrees within a plane perpendicular to said beam of light.

13. A polarization interferometer as claimed in claim 1, further comprising
scale means for measuring the displacement of at least one of said wedge means.

14. A polarization interferometer as claimed in claim 13, wherein
said scale means comprises diffraction grid means for measuring said displacement by using a moiré method.

15. A polarization interferometer as claimed in claim 1, wherein
said photon detector means comprises a lead sulphide cell.

16. A polarization interferometer as claimed in claim 1, wherein
said photon detector means comprises a silicon photodiode.

17. A polarization interferometer as claimed in claim 1, further comprising
electronic amplifying means connected to said photon detector means to provide an amplified output signal; and
analog/digital converting means connected to said amplifying means for converting said output signal into a discrete numerical interferogram.

18. A polarization interferometer as claimed in claim 17, further comprising:
digital filter means for filtering said numerical interferogram;
electronic means connected to said digital filter means for carrying out a Fast Fourier Transformation of the filtered numerical interferogram; and
spectrogram forming means connected to said electronic means for representing said filtered numerical interferogram after Fast Fourier Transformation as a spectrogram.

19. A polarization interferometer as claimed in claim 1, wherein
said Fourier Transformation is a Fast Fourier Transformation.

20. A polarization interferometer comprising:
a source of light for emitting a beam of light;
collimator means receiving said beam of light and converting said beam of light into a beam of parallel rays directed along a first optical axis;
polarizing means for polarizing said beam of parallel rays in a first predetermined polarizing direction, the polarizing means comprising lineraly polarizing beam splitting means for providing a second optical axis forming an angle with said first optical axis;
a double-refractive element including at least two plane-parallel lateral surfaces arranged perpendicularly to the polarized beam of parallel rays, said double-refractive element including two optical wedge means each having a wedge surface and coinciding optical axes, said wedge surfaces facing each other to complement one another to a parallelepiped, said wedge means being displaceable relatively to each other along said wedge surfaces, the polarizing direction of said polarizing beam splitting means being non-parallel to the axes of said optical wedge means;

a double refracting plane-parallel plate forming an optical compensator, the optical axis between said compensator and said wedge means being twisted within a plane perpendicular to said beam of light, said compensator being located in front of said double-refractive element and between said double-refractive element and said polarizing means;

mirror means situated behind said double-refractive element for reflecting said beam of light emitted by the double-refracting element toward said polarizing means for polarizing said beam a second time in a second direction by said polarizing means, said polarizing means thus deviating said rays by said beam splitting means along said second optical axis, said first and said second optical axes forming an angle with each other having a value which is divisible evenly by 90°; and photon detector means receiving said polarized beam of parallel rays emitted by said polarizing means and being arranged in a conjugated plane relatively to said source of light.

21. A polarization interferometer as claimed in claim 20, wherein
the optical axes of said polarizing means are perpendicular to each other.

22. A polarization interferometer as claimed in claim 20, wherein
the optical axes of said polarizing means are parallel to each other.

23. A polarization interferometer as claimed in claim 20, wherein
said polarizing means lineraly polarizes said beam of light.

24. A polarization interferometer as claimed in claim 20, wherein
the optical axes of said polarizing means form an angle of 45 degrees to the axes of said wedge means.

25. A polarization interferometer as claimed in claim 20, further comprising:
a monochromatic light source emitting a beam of monochromatic light, and second photon detector means; and
means for coupling said monochromatic beam of light with said beam of parallel rays, said coupling means including
first beam splitting means located behind said second polarizing means so that said beam of parallel rays and said beam of monochromatic light have opposite directions; and
second beam splitting means arranged before said first polarizing means, when seen in the direction of said beam of monochromatic light, for deviating the beam of monochromatic light toward said second photon detector means.

26. A polarization interferometer as claimed in claim 25, further comprising
optical band-pass filter means arranged before said second photon detector means for allowing only said beam of monochromatic light to pass through.

27. A polarization interferometer as claimed in claim 20, further comprising:
a monochromatic light source emitting a beam of monochromatic light, and a second photon detecting means;
first beam splitting means for coupling said beam of monochromatic light into said beam of parallel rays, said beam splitting means preceding said first polarizing means; and
second beam splitting means arranged behind said second polarizing means for deviating said beam of monochromatic light onto said second photon detector means.

28. A polarization interferometer as claimed in claim 27, further comprising
optical band-pass filter means arranged before said second photon detector means for allowing only said beam of monochromatic light to pass through.

29. A polarization interferometer as claimed in claim 20, further comprising:
a monochromatic light source emitting a beam of monochromatic light along an optical axis separated from the optical axis of said beam of parallel rays;
second photon detector means;
first beam splitting means for dividing said beam of monochromatic light into a first beam and a second beam;
first mirror means for coupling said first beam of monochromatic light into said beam of parallel rays, said first mirror means being arranged between said polarizing means and said compensator;
second beam splitting means arranged between said double-refractive element and said first-mentioned photon detector means so as to provide a deviated optical axis directed toward said second photon detector means;
second mirror means arranged to deviate said second beam toward said second beam splitting means so that said first and said second beams meet again and are thereby directed towards said second photon detector means.

30. A polarization interferometer as claimed in claim 20, wherein one of said wedge means is movable relative to a second of said wedge means, the polarization interferometer further comprising
means forming a Michelson interferometer, said Michelson interferometer means including a movable reflective surface arranged on said movable one of said wedge means.

31. A polarization interferometer as claimed in claim 20, wherein
the optical axes of said compensator, as compared to that of said wedge means, is twisted by 90 degrees within a plane perpendicular to said beam of light.

32. A polarization interferometer as claimed in claim 20, wherein
said predetermined polarizing direction of said polarizing means forms an angle of 45 degrees to the axes of said wedge means.

33. A polarization interferometer as claimed in claim 20, further comprising
scale means for measuring the displacement of at least one of said wedge means.

34. A polarization interferometer as claimed in claim 33, wherein said scale means comprise diffraction grid means for measuring said displacement by using a moiré method.

35. A polarization interferometer as claimed in claim 20, wherein
said photon detector means comprise a lead sulphide cell.

36. A polarization interferometer as claimed in claim 20, wherein
said photon detector means comprise a silicon photodiode.

37. A polarization interferometer as claimed in claim 20, further comprising:
electronic amplifying means connected to said photon detector means to provide an amplified output signal; and
analog/digital converting means connected to said amplifying means for converting said output signal into a discrete numerical interferogram.

38. A polarization interferometer as claimed in claim 37, further comprising:
digital filter means for filtering said numerical interferogram;
electronic means connected to said digital filter means for carrying out a Fast Fourier Transformation of the filtered numerical interferogram; and
spectrogram forming means connected to said electronic means for representing said filtered numerical interferogram after Fast Fourier Transformation as a spectrogram.

39. A polarization interferometer comprising:
a source of light for emitting a beam of light;
collimator means receiving said beam of light and converting it into a beam of parallel rays directed along an optical axis;
first polarizing means for polarizing said beam of parallel rays;
a double-refractive element including at least two plane-parallel lateral surfaces disposed perpendicularly to the polarized beam of parallel rays, said double refractive element including two optical wedge means each having a wedge surface and an optical axis, the optical axes coinciding in a common axis, said wedge surfaces facing each other to complement one another to a parallelepiped, said wedge means being displaceable relatively to each other along said wedge surfaces;
an optical compensator comprising a double refracting plane-parallel plate located along a path of said beam in front of said wedge means, an optical axis between said compensator and said wedge means being twisted within a plane perpendicular to said beam of light;
second polarizing means operative for polarizing the beam emitted by said double-refractive element along its optical axis;
photon detector means receiving the beam emitted by said double-refractive element subsequent to polarization by said second polarizing means;
electronic amplifying means connected to said photon detector means to provide an amplified output signal;
analog/digital converting means connected to said amplifying means for converting said output signal into a discrete numerical interferogram;
digital filter means for filtering said numerical interferogram;
electronic means connected to said digital filter means for carrying out a Fourier Transformation of the filtered numerical interferogram;
spectrogram forming means connected to said electronic means for representing said filtered numerical interferogram after Fourier Transformation as a spectrogram; and
said first polarizing means has at least one optical axis angled in nonparallel relation to said common axis of said wedge means.

40. A polarization interferometer as claimed in claim 38, wherein
said polarizing means has two optical axes, and said polarization interferometer further comprises a mirror for reflecting an optical path back through said second polarizing means and said wedges, said two optical axes of said second polarizing means being perpendicular to each other.

41. A polarization interferometer as claimed in claim 39, wherein
said first polarizing means has two optical axes which are parallel to each other.

42. A polarization interferometer as claimed in claim 39, wherein
said first polarizing means linearly polarizes said beam of light.

43. A polarization interferometer as claimed in claim 39, wherein
an optical axis of said first polarizing means forms an angle of 45 degrees to the common axis of said wedge means.

44. A polarization interferometer comprising:
a source of light for emitting a beam of light;
collimator means receiving said beam of light and converting said beam of light into a beam of parallel rays directed along an optical axis;
first polarizing means for polarizing said beam of parallel rays;
a double-refractive element including at least two plane-parallel lateral surfaces arranged perpendicularly to the polarized beam of parallel rays, said double refractive element including two optical wedge means each having a wedge surface and coinciding optical axes, said wedge surfaces facing each other to complement one another to a parallelepiped, said wedge means being displaceable relatively to each other along said wedge surfaces;
a double refracting plane-parallel plate forming an optical compensator, the optical axis between said compensator and said wedge means being twisted within a plane perpendicular to said beam of light;
second polarizing means for polarizing said polarized beam of parallel rays emitted by said double-refractive element along its optical axis; and
photon detector means receiving said polarized beam of parallel rays emitted by said second polarizing means, the optical axes of said first and second polarizing means being arranged non-parallel to the optical axes of said wedge means, while forming an angle with each other having a value which is divisible evenly by 90°.

* * * * *